US010509458B2

(12) United States Patent
Kosugi et al.

(10) Patent No.: US 10,509,458 B2
(45) Date of Patent: Dec. 17, 2019

(54) INFORMATION DEVICE WITH IMPROVED OPERATING MODES

(71) Applicant: LENOVO (SINGAPORE) PTE. LTD., Singapore (SG)

(72) Inventors: Kazuhiro Kosugi, Yokohama (JP); Takuroh Kamimura, Yokohama (JP); Hajime Yoshizawa, Yokohama (JP); Yuhsaku Sugai, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 105 days.

(21) Appl. No.: 15/864,198

(22) Filed: Jan. 8, 2018

(65) Prior Publication Data
US 2019/0073023 A1 Mar. 7, 2019

(30) Foreign Application Priority Data
Sep. 6, 2017 (JP) ................................. 2017-171600

(51) Int. Cl.
| G06F 1/00 | (2006.01) |
| G06F 1/3296 | (2019.01) |
| G06F 1/20 | (2006.01) |
| G06F 1/3206 | (2019.01) |
| G06F 1/28 | (2006.01) |
| G06F 9/4401 | (2018.01) |

(52) U.S. Cl.
CPC ............ *G06F 1/3296* (2013.01); *G06F 1/206* (2013.01); *G06F 1/28* (2013.01); *G06F 1/3206* (2013.01); *G06F 9/4418* (2013.01)

(58) Field of Classification Search
None
See application file for complete search history.

(56) References Cited

U.S. PATENT DOCUMENTS

| 2011/0131427 A1* | 6/2011 | Jorgenson | ................. | G06F 1/26 713/300 |
| 2012/0005506 A1* | 1/2012 | Walsh | ................... | G06F 1/3203 713/323 |

(Continued)

FOREIGN PATENT DOCUMENTS

| JP | 2014-002727 A | 1/2014 |
| JP | 2014-094033 A | 5/2014 |
| WO | 2013049326 A3 | 4/2013 |

*Primary Examiner* — Nitin C Patel
(74) *Attorney, Agent, or Firm* — Shimokaji IP

(57) ABSTRACT

An information processing device suppresses the entering of a state unintended by a user in a standby mode. The information processing device, which has a standby mode and a normal operation mode, has a mode control portion changing the mode to the standby mode of bringing the state into a first low power consumption state and configured to be switched to a first operating state in which background processing is executed in response to a stop of a display of a display portion, and a power setting processing portion configured to set a first upper limit power consumption in the first operating state and a second upper limit power consumption in a second operating state in the normal operation mode, and set the first upper limit power consumption so as to be lower than the second upper limit power consumption when the mode control portion changes the mode to the standby mode.

9 Claims, 8 Drawing Sheets

(56) References Cited

U.S. PATENT DOCUMENTS

| | | | |
|---|---|---|---|
| 2013/0138985 A1* | 5/2013 | Wang | G06F 1/3234 |
| | | | 713/320 |
| 2013/0318382 A1* | 11/2013 | Yoshihara | G06F 1/3284 |
| | | | 713/323 |
| 2014/0237279 A1* | 8/2014 | Muralidhar | G06F 1/3206 |
| | | | 713/323 |
| 2015/0160710 A1* | 6/2015 | Takenaka | H04W 52/0254 |
| | | | 713/323 |
| 2016/0019936 A1* | 1/2016 | Partiwala | G11C 5/148 |
| | | | 365/227 |
| 2017/0344095 A1* | 11/2017 | Hashimoto | G06F 1/3228 |

* cited by examiner

INFORMATION DEVICE WITH IMPROVED OPERATING MODES

FIELD OF THE INVENTION

The present invention relates to an information processing device, a control method, and a program.

BACKGROUND OF THE INVENTION

In recent years, a technique of providing a low power consumption state capable of being returned by event driven based on an OS (Operating System) or application input in the most active state is known in information processing devices, such as a Laptop PC (Personal Computer) (see Patent Document 1). For example, in Windows 10 (Windows is a registered trademark.) carries modern standby utilizing such a low power consumption state (for example, "S0ix" state) and enables executing of predetermined processing in the background while realizing low power consumption in which the display or the like is stopped by the modern standby.

[Patent Document 1] Published Japanese Translation of PCT application No. 2015-507771

SUMMARY OF THE INVENTION

However, when a standby mode, such as the above-described modern standby, is utilized, processing is sometimes executed in the background in a state where the operation apparently seems to stop by a stop of a display in former information processing devices. Therefore, the chassis surface has been heated in some cases, for example. Thus, the former information processing devices have entered a state unintended by a user in the standby mode in some cases.

The present invention has been made in order to solve the above-described problems. It is an object of the present invention to provide an information processing device, a control method, and a program capable of suppressing the information processing device from entering a state unintended by a user in a standby mode.

In order to solve the above-described problems, one aspect of the present invention is an information processing device, which has a standby mode and a normal operation mode, having a mode control portion changing the mode to the standby mode of bringing the state into a first low power consumption state configured to be switched to a first operating state in which background processing is executed in response to a stop of a display of a display portion, and a power setting processing portion configured to set first upper limit power consumption in the first operating state and second upper limit power consumption in a second operating state in the normal operation mode, and set the first upper limit power consumption so as to be lower than the second upper limit power consumption when the mode control portion changes the mode to the standby mode.

According to one aspect of the present invention, in the information processing device, the power setting processing portion is further configured to set a third upper limit power consumption in a second low power consumption state, the mode control portion changes the state to the second low power consumption state in which the third upper limit power consumption is lower than the first upper limit power consumption when a temperature of the chassis surface exceeds a predetermined first temperature in the standby mode.

According to one aspect of the present invention, in the information processing device, the mode control portion changes the state to the second low power consumption state when the temperature of the chassis surface exceeds the first temperature after the lapse of a predetermined first period after changing the mode to the standby mode.

According to one aspect of the present invention, in the information processing device, the mode control portion returns the state to the first operating state when the temperature of the chassis surface decreases to a temperature equal to or lower than a second temperature which is a temperature equal to or lower than the first temperature after changing the state to the second low power consumption state from the first operating state.

According to one aspect of the present invention, in the information processing device, the mode control portion returns the state to the first operating state when a predetermined second period elapses after changing the state to the second low power consumption state from the first operating state.

According to one aspect of the present invention, in the information processing device, the second low power consumption state includes a hibernation state which is a suspension state in which the work contents of the background processing are saved in a nonvolatile storage device, and the mode control portion changes the state to the hibernation state when the temperature of the chassis surface exceeds the first temperature in the standby mode.

According to, one aspect of the present invention, in the information processing device, the mode control portion brings the state into the first low power consumption state when the execution of the background processing is completed in the standby mode.

According to one aspect of the present invention, in the information processing device, the mode control portion cancels the standby mode in response to a user's action or the occurrence of a predetermined event in the background processing, and the power setting processing portion changes the setting of the second upper limit power consumption according to the operating environment when the standby mode is canceled by the mode control portion.

According to one aspect of the present invention, in the information processing device, the first low power consumption state is an extended state of an S0 state specified in the ACPI (Advanced Configuration and Power Interface) specification and is an S0ix state in which the first upper limit power consumption is reduced to be lower than forth upper limit power consumption in the S0 state.

One aspect of the present invention is a control method having a mode control step in which an information processing device changes the mode to a standby mode of bringing the state into a first low power consumption state capable of being switched to a first operating state in which background processing is executed in response to a stop of a display of a display portion, and a power setting processing step in which the information processing device sets first upper limit power consumption in the first operating state so as to be lower than second upper limit power consumption in a second operating state in a normal operation mode when the mode is changed to the standby mode by the mode control step.

One aspect of the present invention is a program for causing, in the information processing device, a computer to execute a mode control step of changing the mode to a standby mode of bringing the state into a first low power consumption state capable of being switched to a first operating state in which background processing is executed in response to a stop of a display of a display portion and a power setting processing step of setting first upper limit power consumption in the first operating state so as to be lower than second upper limit power consumption in the second operating state in a normal operation mode when the mode is changed to the standby mode.

The above-described aspects of the present invention can suppress the information processing device from entering a state unintended by a user in the standby mode.

DETAILED DESCRIPTION OF THE INVENTION

Hereinafter, an information processing device and a control method according to one embodiment of the present invention are described with reference to the drawings.

First Embodiment

Figure 1:
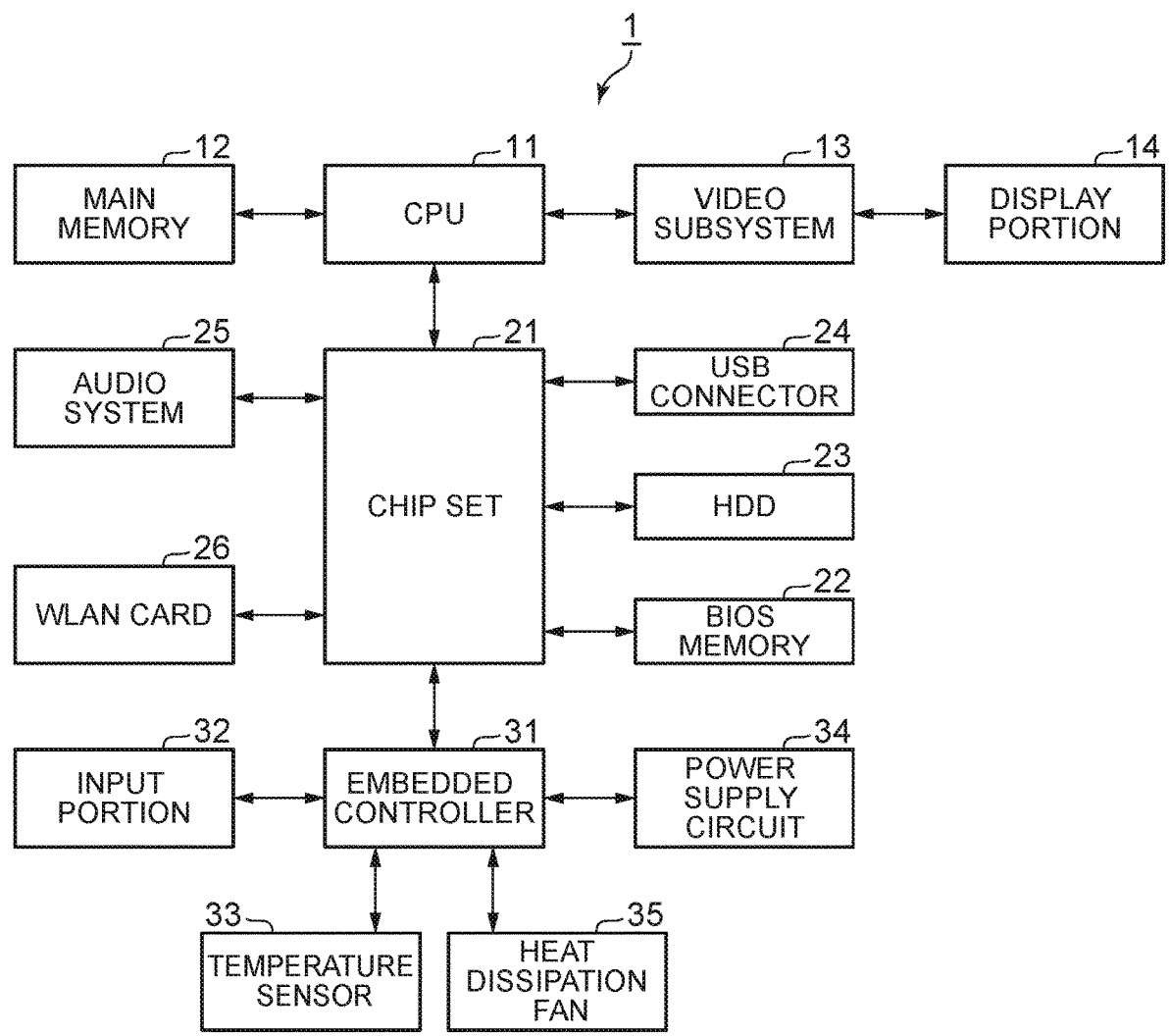
FIG. 1 is a view illustrating an example of the main hardware configuration of a Laptop PC according to a first embodiment.

FIG. 1 is a view illustrating an example of the main hardware configuration of a Laptop PC 1 according to a first embodiment. In this embodiment, the Laptop PC 1 is described as an example of an information processing device.

As illustrated in FIG. 1, the Laptop PC 1 has a CPU 11, a main memory 12, a video subsystem 13, a display portion 14, a chip set 21, a BIOS memory 22, an HDD 23, a USB connector 24, an audio system 25, a WLAN card 26, an embedded controller 31, an input portion 32, a temperature sensor 33, a power supply circuit 34, and a heat dissipation fan 35.

The CPU (Central Processing Unit) 11 executes various kinds of operation processing by program control to control the entire Laptop PC 1.

The main memory 12 is a writable memory to be utilized as a reading area of execution programs of the CPU or a working area in which processing data of the execution program is written. The main memory 12 contains a plurality of DRAM (Dynamic Random Access Memory) chips, for example. The execution programs include various drivers for hardware operating the OS and peripheral devices, various services/utilities, application programs, and the like.

The video subsystem 13 is a subsystem for realizing functions relevant to an image display and contains a video controller. The video controller processes a drawing instruction from the CPU 11 and writes the processed drawing information in a video memory and reads the drawing information from the video memory, and then outputs the drawing information to the display portion 14 as drawing data (display data).

The display portion 14 is a liquid crystal display and displays a display screen based on the drawing data (display data) output from the video subsystem 13, for example.

The chip set 21 has controllers, such as a USB (Universal Serial Bus), a serial ATA (AT Attachment), an SPI (Serial Peripheral Interface) bus, a PCI (Peripheral Component Interconnect) bus, a PCI-Express bus, and an LPC (Low Pin Count) bus, and a plurality of devices is connected to the chip set 21. In FIG. 1, the BIOS memory 22, the HDD 23, the USB connector 24, the audio system 25, the WLAN card 26, and the embedded controller 31 are connected to the chip set 21 as examples of the devices.

The BIOS (Basic Input Output System) memory 22 contains, for example, an electrically rewritable nonvolatile memory, such as an EEPROM (Electrically Erasable Programmable Read Only Memory) and a flash ROM. The BIOS memory 22 stores the BIOS and system firmware for controlling the embedded controller 31 and the like, for example.

The HDD (Hard Disk Drive) 23 (an example of a nonvolatile storage device) stores the OS, various drivers, various services/utilities, application programs, and various data. The USB connector 24 is a connector for connecting the peripheral devices using a USB. The audio system 25 executes recording, reproduction, and outputting of sound data.

The WLAN (Wireless Local Area Network) card 26 is connected to a network by wireless (radio) LAN to perform data communication. When receiving data from the network, for example, the WLAN card 26 generates an event trigger showing that the WLAN card 26 receives the data.

The embedded controller 31 is a One-Chip Microcomputer monitoring and controlling various devices (peripheral devices, a sensor, and the like) irrespective of the system state of the Laptop PC 1. Moreover, the embedded controller 31 has a power supply controlling function controlling the power supply circuit 34. The embedded controller 31 contains a CPU, a ROM, a RAM, and the like which are not illustrated and has an A/D input terminal, a D/A output terminal, a timer, and a digital input/output terminal having a plurality of channels. To the embedded controller 31, the input portion 32, the temperature sensor 33, the power supply circuit 34, the heat dissipation fan 35, and the like are connected through the input/output terminals. The embedded controller 31 controls operations thereof.

The embedded controller 31 controls the power supply circuit 34 according to the system states (for example, S0 state to S5 state) specified in the Advanced Configuration and Power Interface (ACPI) specification. Herein, the S0 state is the most active state and is a usual operating state (normal operating state). Moreover, the S5 state is a shutdown state (Power-off state) in which the power supply is turned off by software. The S4 state is a hibernation state which is a suspension state in which the work contents are saved in the HDD 23 and the like.

The CPU 11 of this embodiment is compatible with the S0ix state which is the low power consumption state which can be promptly returned to the S0 state. The embedded controller 31 executes control of the power supply circuit 34 corresponding to the standby mode (for example, modern standby mode) utilizing the S0ix state. Herein, the S0ix state is an extended state of the S0 state specified in the ACPI specification and is the S0ix state in which the power consumption is reduced to be lower than that in the S0 state.

In this embodiment, the modern standby mode is a standby mode in which the power consumption is lower than that in the normal operation mode showing a usual operation of the Laptop PC 1. In the modern standby mode, the S0ix state, the S0 state in which background processing is executed, and the hibernation state described above are switched to be used in a state where the display of the display portion 14 is turned off (stop). The details of the modern standby mode are described later.

The embedded controller 31 has a temperature table showing the temperature conditions for notifying state changes by monitoring the temperatures detected by the temperature sensor 33 and outputs a notification to the BIOS when predetermined temperature conditions are satisfied based on the temperature table.

The input portion 32 is an input device, such as a keyboard, a pointing·device, and a touchpad, for example.

The temperature sensor 33 is disposed in the periphery of a heat source, such as the periphery of the CPU 11, and detects the temperature, for example. The temperature sensor 33 is used when detecting the temperature of the chassis surface, for example.

The power supply circuit 34 contains a DC/DC converter, a charge/discharge unit, a battery unit, an AC/DC adapter, and the like, for example, and converts a direct-current voltage supplied from the AC/DC adapter or the battery unit to a plurality of voltages required for operating the Laptop PC. Moreover, the power supply circuit 34 supplies power to each portion of the Laptop PC 1 based on the control from the embedded controller 31.

The heat dissipation fan 35 operates a fan to blow air to thereby suppress the heat generation of the Laptop PC 1. The heat dissipation fan 35 is stopped by the embedded controller 31 in the modern standby mode.

Next, the system of the Laptop PC 1 according to this embodiment is described with reference to FIG. 2.

Figure 2:
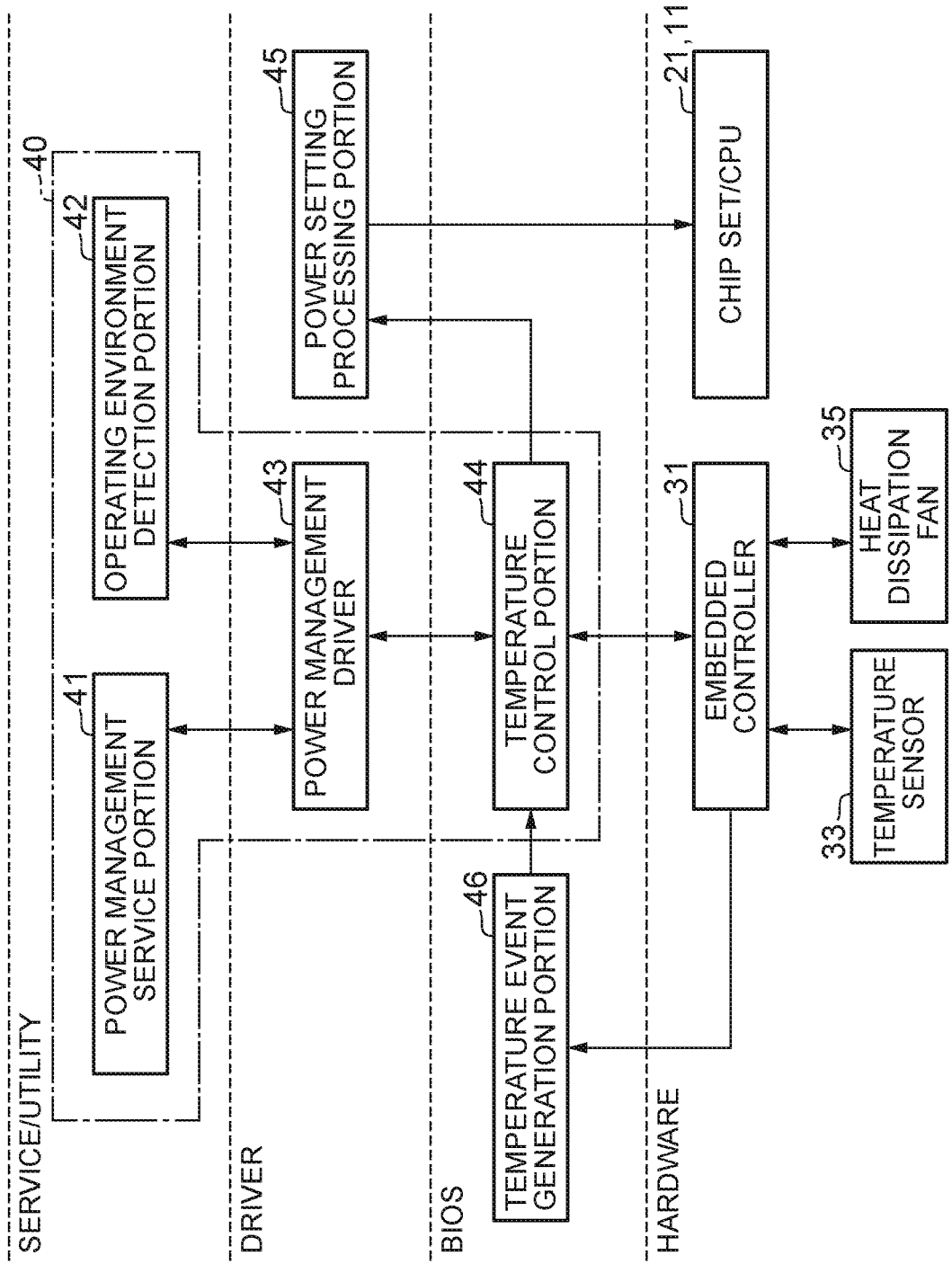
FIG. 2 is a block diagram illustrating an example of the function configuration of the Laptop PC according to the first embodiment.

FIG. 2 is a block diagram illustrating an example of the function configuration of the Laptop PC 1 according to this embodiment.

As illustrated in FIG. 2, the system of the Laptop PC 1 has a power management service portion 41, an operating environment detecting portion 42, a power management driver 43, a temperature control portion 44, a power setting processing portion 45, and a temperature event generation portion 46 which are realized by software. The system of the Laptop PC 1 has the chip set/CPU (21, 11), the embedded controller 31, the temperature sensor 33, and the heat dissipation fan 35 as the main hardware of this embodiment.

In FIG. 2, the service/utility, the driver, and the BIOS are realized by reading of programs stored in the HDD 23 or the BIOS memory 22 in the main memory 12, and then execution of the programs by the CPU 11. Herein, the power management service portion 41 and the operating environment detecting portion 42 correspond to the service/utility and the power management driver 43 and the power setting processing portion 45 correspond to the driver. The temperature control portion 44 and the temperature event generation portion 46 correspond to the BIOS.

The power management service portion 41 provides a service for power management (Power consumption management). The power management service portion 41 outputs an instruction of changing the system state to the power management driver 43 in response to an event trigger changing the system state (Operation mode), for example.

The operating environment detecting portion 42 is an Intelligent Sensing Service, for example and utilizes various sensors to detect the current state (Operating environment) of the Laptop PC 1, such as work on a desk or work on the knee, for example.

The power management driver 43 is an ACPI driver, for example, and manages the power consumption of the system of the Laptop PC 1 according to the system state. The power management driver 43 controls the temperature control portion 44 in response to an instruction of changing the system state and an instruction of changing the operation mode from the power management service portion 41 or the operating environment detected by the operating environment detecting portion 42 to execute the temperature management.

The temperature control portion 44 is a DYTC (Dynamic Thermal Control ACPI I/F method), for example, and controls the embedded controller 31 for temperature management and instructs a change of the upper limit power consumption of the chip set/CPU (21, 11) to the power setting processing portion 45. Herein, the upper limit power consumption is a power consumption level referred to as "Power Limit" which can be set and shows the upper limit of the power consumption per unit time which can be consumed by the CPU 11, for example. The temperature control portion 44 instructs a setting change of the power supply circuit 34 and control of the heat dissipation fan 35 to the embedded controller 31. Moreover, the temperature control portion 44 instructs a setting for the temperature detection of the chassis surface to the embedded controller 31.

The power management service portion 41, the operating environment detecting portion 42, the power management driver 43, and the temperature control portion 44 correspond to a mode control portion 40.

The mode control portion 40 stops the display of the display portion 14 in response to a user's action of bringing the state into a state in which the user cannot see the display of the display portion 14, for example. The mode control portion 40 changes the mode to a modern standby mode bringing the state into the S0ix state (First low power consumption state) capable of being switched to an operating state (S0 state, First operating state) executing background processing in response to the stop of the display, for example. The mode control portion 40 changes the system state to the S0ix state from the usual operating state (S0 state) through the embedded controller 31 and the power setting processing portion 45.

Herein, the user's action of bringing the state into the state in which the user cannot see the display of the display portion 14 is, for example, an action of bringing a display chassis (LCD chassis) carrying the display portion 14 into a closed state by a user, an action of selecting the modern standby mode by pressing down of a power button, an operation of the OS, or the like by a user. The background processing is processing not accompanying the display of the display portion 14 and, for example, is processing of acquiring data (for example, e-mail data, update data of the OS or an application program, and the like) received by the WLAN card 26 or the like.

When changing the mode to the modern standby mode, the mode control portion 40 causes the power setting processing portion 45 to change the upper limit power consumption in the operating state (S0 state) so that the temperature of the chassis surface is equal to or lower than a predetermined temperature TH1 (equal to or lower than the first temperature). More specifically, the mode control portion 40 sets the upper limit power consumption in the S0 state (First operating state) so as to be lower than the upper limit power consumption in the S0 state (Second operating state) in the normal operation mode. Herein, the temperature TH1 is a temperature at which, when touching the chassis surface, a user does not feel the chassis surface hot (does not feel uncomfortable) and a temperature around the body temperature, for example. The upper limit power consumption (PW_L) herein is a power as low as about ¼ of the upper limit power consumption (PW_H) in the normal operation mode before entering the modern standby mode, for example.

The temperature of the chassis surface is detected using the embedded controller 31 and the temperature sensor 33 described above, for example. The temperature of the chassis surface may be directly detected by the temperature sensor 33 disposed on the chassis surface or may be a temperature presumed based on the temperature detected by the temperature sensor 33 disposed in a place other than the chassis surface.

Moreover, the mode control portion 40 brings the state into the operating state (S0 state) having low upper limit power consumption (PW_L) periodically by a timer of the embedded controller 31 or by the detection of the reception by the WLAN card 26, and then executes the background processing in the modern standby mode. Moreover, the mode control portion 40 brings the state into the S0ix state when the execution of the background processing is completed in the modern standby mode.

Moreover, the mode control portion 40 changes the state to the hibernation state (S4 state, Second low power consumption state) in which the power consumption is lower than that in the operating state (S0 state of PW_L) when the temperature of the chassis surface exceeds the temperature TH1 in the modern standby mode.

After the lapse of a predetermined first period of time (for example, after the lapse of 3 minutes) after changing the mode to the modern standby mode, the mode control portion 40 changes the state to the hibernation state (S4 state) when the temperature of the chassis surface exceeds the temperature TH1. More specifically, when the predetermined first period of time does not elapse after changing the mode to the modern standby mode, the mode control portion 40 does not change the state to the hibernation state (S4 state) even when the temperature of the chassis surface exceeds the temperature TH1.

Moreover, the mode control portion 40 returns the state to an operating state (S0 state of PW_L) when the temperature of the chassis surface decreases to be equal to or lower than a predetermined temperature TH2 (equal to or lower than second temperature) after changing the state to the hibernation state (S4 state) from the operating state (S0 state of PW_L), for example. Herein, the temperature TH2 is a temperature equal to or lower than the temperature TH1 and may be a temperature equal to the temperature TH1, for example.

Moreover, the mode control portion 40 cancels the modern standby mode in response to a user's action or the occurrence of a predetermined event in the background processing. The user's action herein is pressing down of a power button, an operation of the input portion 32, or the like by a user, for example. The occurrence of a predetermined event in the background processing is an event generated by receiving of an e-mail or the like, for example.

The mode control portion 40 changes the setting of the upper limit power consumption in the operating state (S0 state) based on the current operating environment detected by the operating environment detecting portion 42 in response to a user's action or the occurrence of a predetermined event and turns on the display of the display portion 14 to change the state to the normal operation mode from the modern standby mode. For example, when cancelling the modern standby mode, the mode control portion 40 causes the power setting processing portion 45 to set the upper limit power consumption in the operating state (S0 state) according to the operating environment. Moreover, the mode control portion 40 changes the system state to the usual operating state (for example, S0 state of PW_H) from the S0ix state through the embedded controller 31 and the power setting processing portion 45.

The power setting processing portion 45 is a DPTF (Dynamic Platform and Thermal Framework) driver, for example and sets the upper limit power consumption of the CPU 11 and the chip set 21. The power setting processing portion 45 has a state table which is a table of the upper limit power consumption and an action table showing the contents of the setting processing to the CPU 11 and the chip set 21. The power setting processing portion 45 executes setting processing corresponding to the upper limit power consumption based on the state table and the action table.

The power setting processing portion 45 changes the setting of the upper limit power consumption of the CPU 11 and the chip set 21 based on instructions of the temperature control portion 44 of the mode control portion 40, for example. When the mode control portion 40 changes the mode to the modern standby mode, for example, the power setting processing portion 45 changes the setting of the upper limit power consumption in the operating state (S0 state) to the setting of the upper limit power consumption PW_L so that the temperature is equal to or lower than the predetermined temperature TH1 described above, for example. Moreover, the power setting processing portion 45 changes the setting of the upper limit power consumption in the operating state (S0 state) to the setting of the upper limit power consumption according to the operating environment when the modern standby mode is canceled by the mode control portion 40, for example.

When receiving a notification showing that predetermined temperature conditions are satisfied from the embedded controller 31, the temperature event generation portion 46 generates a temperature event trigger, and then outputs the temperature event trigger to the temperature control portion 44 of the mode control portion 40. The temperature event generation portion 46 outputs the temperature event trigger to the temperature control portion 44 of the mode control portion 40 when the temperature of the chassis surface exceeds the temperature TH1, the temperature of the chassis surface decreases to be equal to or lower than the temperature TH2, or the like, for example.

Next, the operation of the Laptop PC 1 according to this embodiment is described with reference to the drawings.

Figure 3:
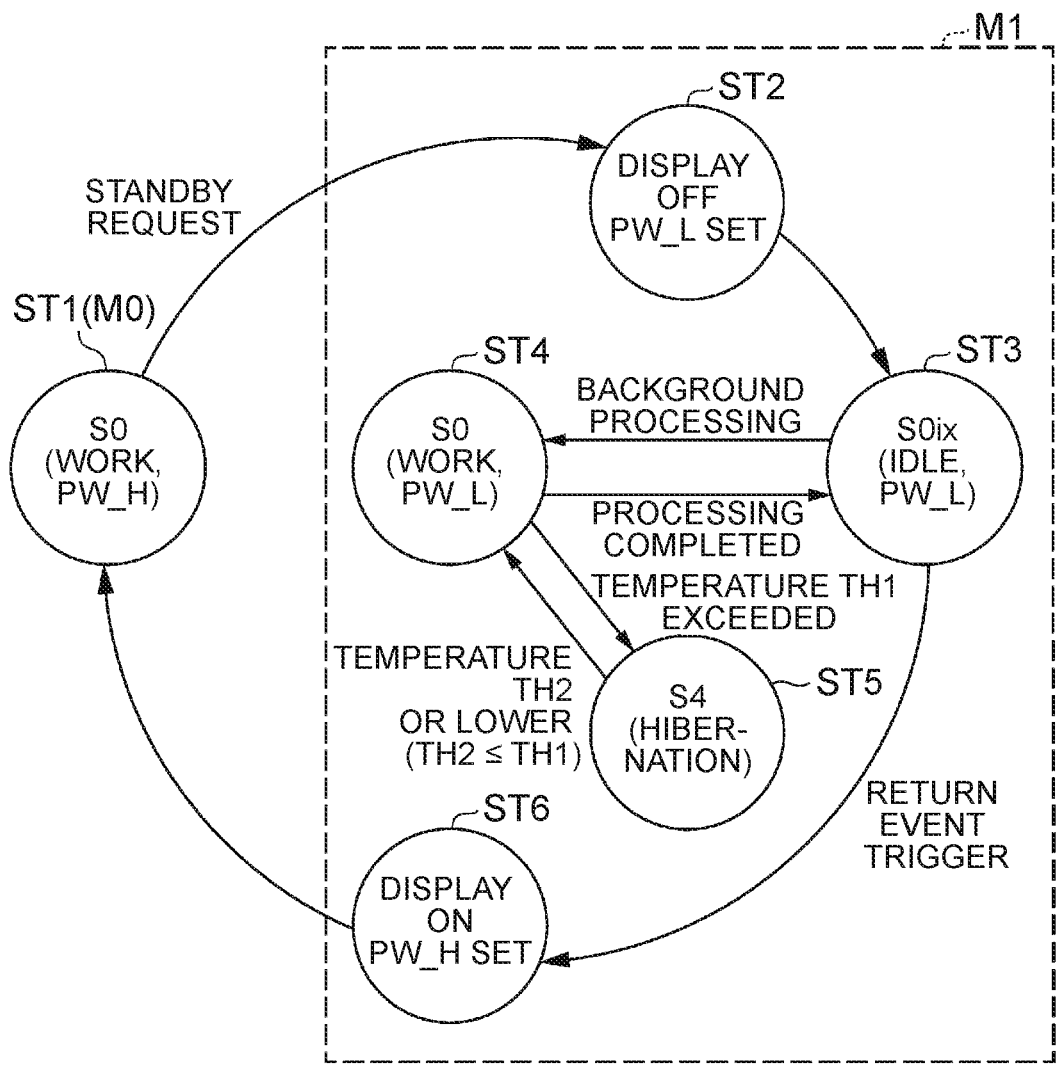
FIG. 3 is a view illustrating an example of the transition state of the Laptop PC according to the first embodiment.

FIG. 3 is a view illustrating an example of the transition state of the Laptop PC 1 according to this embodiment.

In FIG. 3, a state ST1 is a state in which the Laptop PC 1 is in a normal operation mode M0. In the state ST1, the system state is the usual operating state (S0 state, WORK state) and the upper limit power consumption (PW_H) is set. Herein, the operating state (S0 state) in the normal operation mode M0 is defined as a second operating state.

In the state ST1, when there is a standby request that a display chassis (LCD chassis) is brought into a closed state or the like by a user, the Laptop PC 1 enters a modern standby mode M1. By the standby request, the Laptop PC 1 first enters a state ST2.

In the state ST2, the Laptop PC 1 stops the display of the display portion 14 (Display OFF), and then changes to the setting of the upper limit power consumption (PW_L) so that the temperature of the chassis surface is equal to or lower than the temperature TH1. In the modern standby mode M1, the Laptop PC 1 stops the heat dissipation fan 35. For example, the power management service portion 41 of the mode control portion 40 causes the video subsystem 13 to stop the display of the display portion 14 in response to the standby request.

Moreover, the power management service portion 41 instructs the transition to the modern standby mode M1 to the temperature control portion 44 of the mode control portion 40 through the power management driver 43. The temperature control portion 44 causes the power setting processing portion 45 to change the setting from the setting of the upper limit power consumption (PW_H) to the setting of the upper limit power consumption (PW_L) in response to the display OFF of the display portion 14. More specifically, the power setting processing portion 45 performs the setting of the upper limit power consumption (PW_L) to the CPU 11 and the chip set 21 based on the instruction of the temperature control portion 44. Then, the Laptop PC 1 enters a state ST3.

In the state ST3, the Laptop PC 1 brings the system state into the S0ix state (IDLE state, PW_L). More specifically, the temperature control portion 44 brings the system state into the S0ix state through the embedded controller 31 and the power setting processing portion 45. In the state ST3, when the background processing occurs, the Laptop PC 1 enters a state ST4. For example, the Laptop PC 1 enters the state ST4 periodically by a timer of the embedded controller 31 or by the detection of the reception by the WLAN card 26.

In the state ST4, the temperature control portion 44 brings the system state into the S0 state (WORK state, PW_L) through the embedded controller 31 and the power setting processing portion 45, and then background processing is executed by the OS or an application program. Moreover, in the state ST4, when the background processing is completed, the Laptop PC 1 is returned to the state ST3 described above. Herein, the operating state (S0 state) in the modern standby mode M1 is defined as the first operating state.

Moreover, in the state ST4, when the temperature of the chassis surface exceeds the temperature TH1, the Laptop PC 1 enters a state ST5. The temperature control portion 44 brings the system state into the hibernation state (S4 state) which is the state ST5 when receiving an event trigger showing that the temperature of the chassis surface exceeds the temperature TH1 through the embedded controller 31 and the temperature event generation portion 46. The temperature control portion 44 brings the system state into the hibernation state (S4 state), and then interrupts the background processing through the embedded controller 31 and the power setting processing portion 45.

In the state ST5, when the temperature of the chassis surface becomes equal to or lower than the temperature TH2, the Laptop PC 1 is returned to the state ST4 again, and then executes background processing. More specifically, when receiving an event trigger showing that the temperature of the chassis surface becomes equal to or lower than the temperature TH2, the temperature control portion 44 cancels the hibernation state (S4 state), and then returns the state to the state ST4 through the embedded controller 31 and the temperature event generation portion 46. The temperature control portion 44 brings the system state into the S0 state, and then executes background processing through the embedded controller 31 and the power setting processing portion 45.

In the state ST3 described above, when a return event trigger is generated, the Laptop PC 1 enters a state ST6. Herein, the return event trigger is an event trigger generated by pressing down of the power button, an operation of the input portion 32, or the like by a user, for example. The power management service portion 41 causes the video subsystem 13 to resume the display of the display portion 14 in response to the event trigger. Moreover, the power management service portion 41 instructs the cancellation of the modern standby mode M1 to the temperature control portion 44 through the power management driver 43. The temperature control portion 44 causes the power setting processing portion 45 to change the setting from the setting of the upper limit power consumption (PW_L) to the setting of the upper limit power consumption (PW_H). Herein, the upper limit power consumption (PW_H) to be changed is selected based on the operating environment detected by the operating environment detecting portion 42. Then, the Laptop PC 1 is returned to the state ST1 (Normal operation mode M0).

Although not illustrated and explained in FIG. 3, also in the state ST4 and state ST5, the Laptop PC 1 is returned to the state ST1 through a state ST6 by the return event trigger in the same manner as in the case of the state ST3. However, a period until the mode is returned to the normal operation mode M0 from the modern standby mode M1 varies depending on each state. The return period is the longest in the case of the state ST5 and the shortest in the case of the state ST4.

Next, the shift processing to the modern standby mode in this embodiment is described with reference to FIG. 4.

Figure 4:
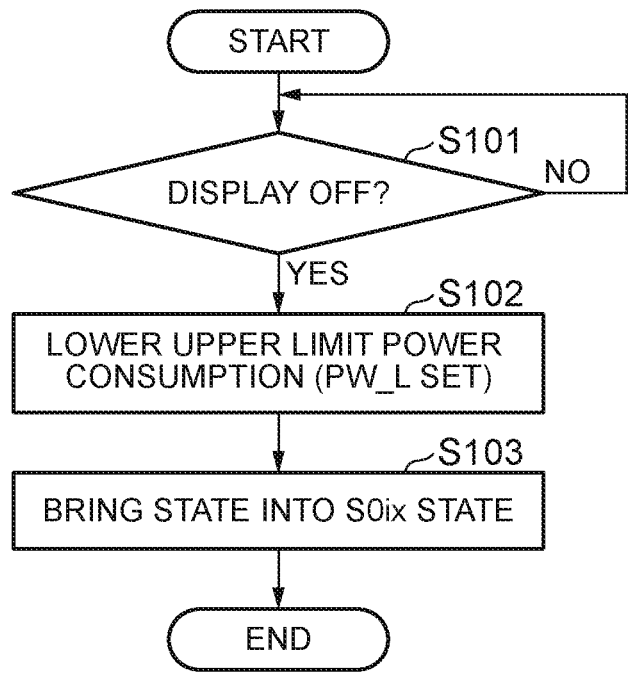
FIG. 4 is a flow chart illustrating an example of shift processing to a modern standby mode in the first embodiment.

FIG. 4 is a flow chart illustrating an example of the shift processing to the modern standby mode in this embodiment.

In FIG. 4, the mode control portion 40 first detects a standby request that the display chassis (LCD chassis) is brought into a closed state or the like by a user through the embedded controller 31, for example, and then causes the display portion 14 to turn OFF the display in response to the standby request.

Moreover, the mode control portion 40 judges whether the display is turned OFF (Step S101). The mode control portion 40 advances the processing to Step S102 when the display is turned OFF (Step S101: YES). The mode control portion 40 returns the processing to Step S101 when the display is not turned OFF (Step S101: NO).

In Step S102, the mode control portion 40 reduces the upper limit power consumption (PW_L setting) in response to the display-off of the display portion 14. More specifically, the mode control portion 40 causes the power setting processing portion 45 to change the upper limit power consumption in the operating state (S0 state) to the setting of the upper limit power consumption (PW_L). Thus, the power setting processing portion 45 performs the setting of the upper limit power consumption (PW_L) to the CPU 11 and the chip set 21.

Next, the mode control portion 40 brings the system state into the S0ix state (Step S103). More specifically, the mode control portion 40 brings the system state into the S0ix state through the embedded controller 31 and the power setting processing portion 45. By the processing of Step S103, the Laptop PC 1 completes the shift processing to the modern standby mode.

Next, the background processing in the modern standby mode of this embodiment is described with reference to FIG. 5.

Figure 5:
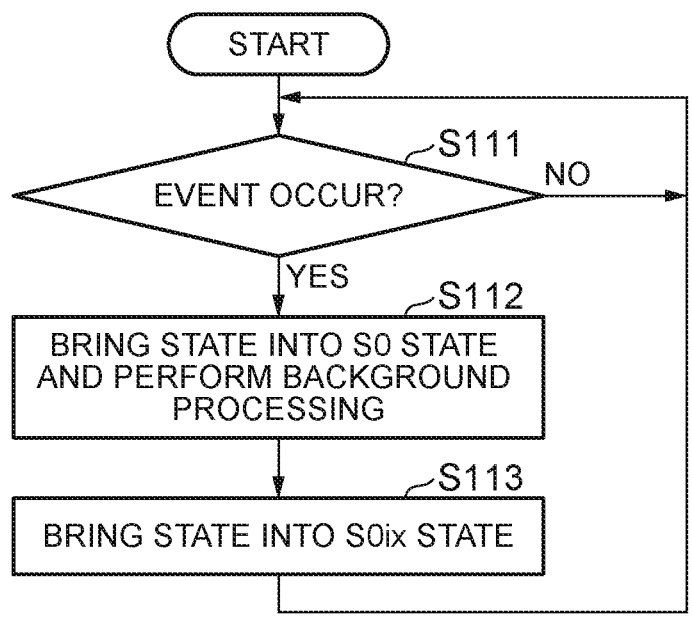
FIG. 5 is a flow chart illustrating an example of background processing in the modern standby mode of the first embodiment.

FIG. 5 is a flow chart illustrating an example of the background processing in the modern standby mode of this embodiment.

In FIG. 5, the Laptop PC 1 is in the modern standby mode and in the state of waiting in the S0ix state.

In FIG. 5, the mode control portion 40 judges whether an event occurs (Step S111). The mode control portion 40 judges whether an event trigger for executing the background processing is generated periodically by a timer of the embedded controller 31 or by the detection of the reception by the WLAN card 26, for example. When the event trigger is generated (Step S111: YES), the mode control portion 40 advances the processing to Step S112. When the event trigger is not generated (Step S111: NO), the mode control portion 40 maintains the state of waiting in the S0ix state of Step S111.

In Step S112, the mode control portion 40 brings the system state into the S0 state, and then executes the background processing. More specifically, the mode control portion 40 brings the state into the S0 state in which the upper limit power consumption is lowered, and then causes the OS or an application program to execute the background processing.

Next, the mode control portion 40 brings the state into the S0ix state (Step S113). When the background processing by the OS or an application program is completed, the mode control portion 40 brings the system state into the S0ix state, and then returns the state to the state of waiting in the S0ix state through the embedded controller 31 and the power setting processing portion 45.

Next, the transition processing to the hibernation state in the modern standby mode of this embodiment is described with reference to FIG. 6.

Figure 6:
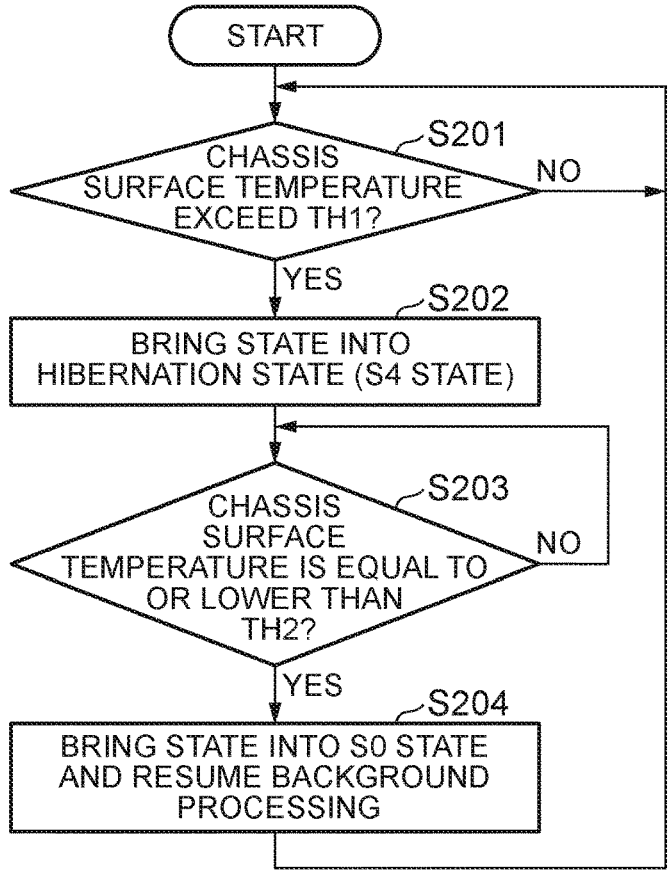
FIG. 6 is a flow chart illustrating an example of transition processing to a hibernation state in the modern standby mode of the first embodiment.

FIG. 6 is a flow chart illustrating an example of the transition processing to the hibernation state in the modern standby mode of this embodiment.

In FIG. 6, the initial state of the Laptop PC 1 is in the modern standby mode and in the S0 state and in the state in which the background processing is executed. The upper limit power consumption in the S0 state is set so that the temperature of the chassis surface is equal to or lower than the temperature TH1 in the case of the usual operating environment, and therefore the temperature does not exceed the temperature TH1 in this state. However, in a sealed state in which the Laptop PC 1 is stored in a bag or the like, for example, no heat transfer occurs, and therefore the temperature of the chassis surface exceeds the temperature TH1 in some cases. An example illustrated in FIG. 6 herein describes processing in the modern standby mode when the Laptop PC 1 is stored in a bag or the like as described above.

In FIG. 6, the mode control portion 40 judges whether the temperature of the chassis surface exceeds the temperature TH1 (Step S201). The mode control portion 40 judges whether an event trigger showing that the temperature of the chassis surface exceeds the temperature TH1 is received through the embedded controller 31 and the temperature event generation portion 46. When the temperature of the chassis surface exceeds the temperature TH1 (Step S201: YES), the mode control portion 40 advances the processing to Step S202. When the temperature of the chassis surface does not exceed the temperature TH1 (Step S201: NO), the mode control portion 40 returns the processing to Step S201.

In Step S202, the mode control portion 40 brings the state into the hibernation state (S4 state). The mode control portion 40 brings the system state into the hibernation state (S4 state), and then interrupts the background processing through the embedded controller 31 and the power setting processing portion 45.

Next, the mode control portion 40 judges whether the temperature of the chassis surface decreases to be equal to or lower than the temperature TH2 (Step S203). The mode control portion 40 judges whether an event trigger showing that the temperature of the chassis surface decreases to be equal to or lower than the temperature TH2 is received through the embedded controller 31 and the temperature event generation portion 46. When the temperature of the chassis surface decreases to be equal to or lower than the temperature TH2, the mode control portion 40 advances the processing to Step S204 (Step S203: YES). When the event trigger is not generated (Step S203: NO), the mode control portion 40 maintains the state of suspending in the hibernation state (S4 state) of Step S203.

In Step S204, the mode control portion 40 brings the system state into the S0 state, and then resumes the background processing. The mode control portion 40 brings the state into the S0 state in which the upper limit power consumption is lowered, and then causes the OS or an application program to resume the background processing through the embedded controller 31 and the power setting processing portion 45. After the processing of Step S204, the mode control portion 40 returns the processing to Step S201.

Next, return processing from the modern standby mode in this embodiment is described with reference to FIG. 7.

Figure 7:
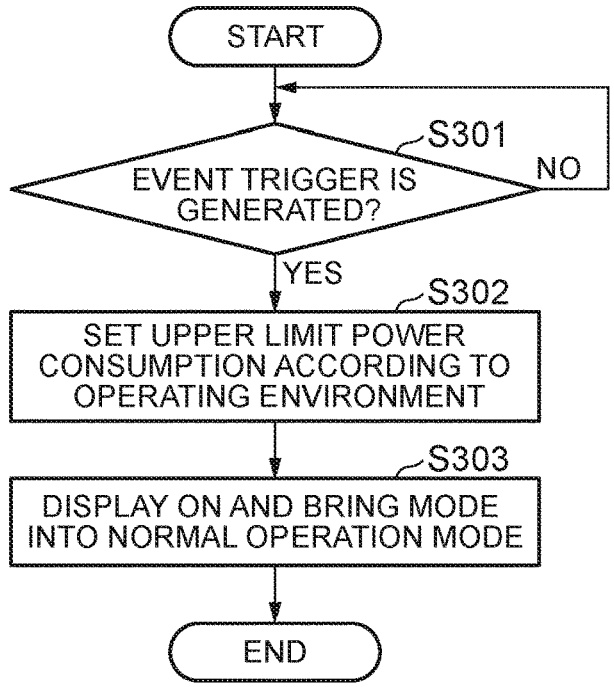
FIG. 7 is a flow chart illustrating an example of return processing from the modern standby mode in the first embodiment.

FIG. 7 is a flow chart illustrating an example of the return processing from the modern standby mode in this embodiment.

In FIG. 7, the Laptop PC 1 is in the modern standby mode and in a state of waiting in the S0ix state.

In FIG. 7, the mode control portion 40 judges whether a return event trigger is generated (Step S301). The mode control portion 40 judges whether the event trigger is generated by pressing down of a power button, an operation of the input portion 32, or the like by a user, for example. When the event trigger is generated (Step S301: YES), the mode control portion 40 advances the processing to Step S302. When the event trigger is not generated (Step S301: NO), the mode control portion 40 maintains the state of waiting in the S0ix state of Step S301.

In Step S302, the mode control portion 40 brings the system state into the S0 state, and then sets the upper limit power consumption according to the operating environment. More specifically, the mode control portion 40 brings the state into the S0 state by the event trigger and determines the optimal upper limit power consumption based on the operating environment detected by the operating environment detecting portion 42, and then causes the power setting processing portion 45 to change to the setting of the optimal upper limit power consumption.

Next, the mode control portion 40 turns ON the display, and then brings the mode into the normal operation mode (Step S303). After the processing of Step S303, the mode control portion 40 completes the return processing.

Figure 8:
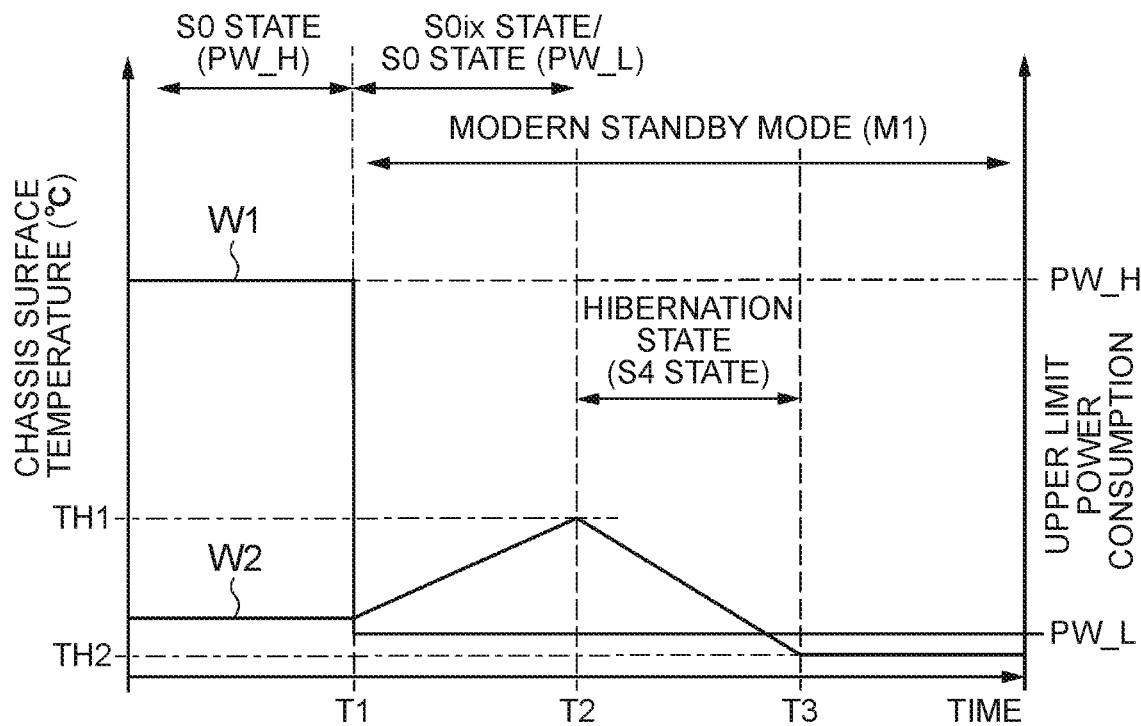
FIG. 8 is a first view explaining an example of an operation in the modern standby mode of the Laptop PC according to the first embodiment.
Figure 9:
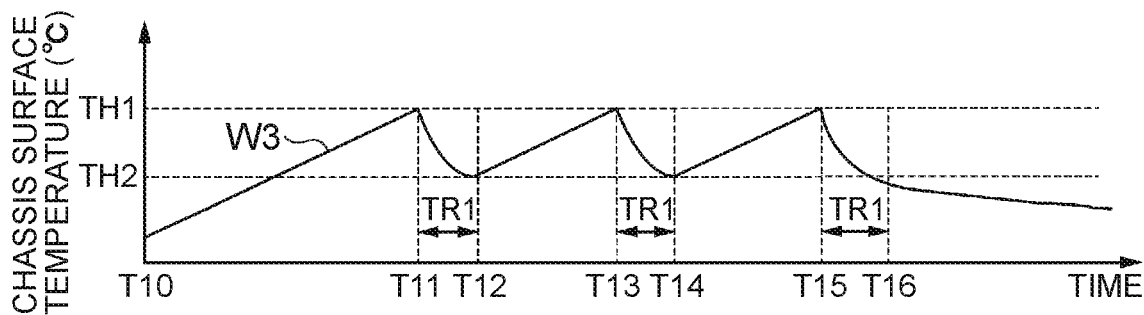
FIG. 9 is a second view explaining an example of the operation in the modern standby mode of the Laptop PC according to the first embodiment.
Figure 10:
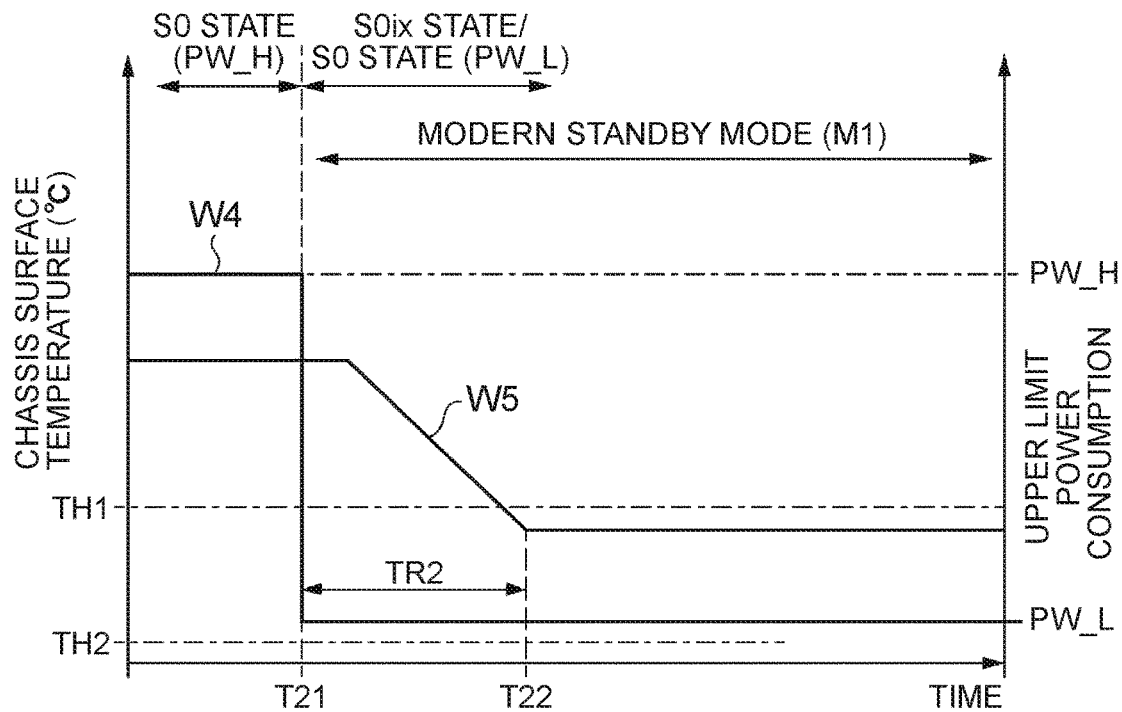
FIG. 10 is a third view explaining an example of the operation in the modern standby mode of the Laptop PC according to the first embodiment.

Next, an operation in the modern standby mode according to this embodiment is described using the temperature of the chassis surface and the upper limit power consumption with reference to FIG. 8 to FIG. 10.

FIG. 8 to FIG. 10 are views explaining an example of the operation in the modern standby mode of the Laptop PC 1 according to this embodiment.

In FIG. 8, the vertical axes of the graph represent the temperature (° C.) of the chassis surface and the upper limit power consumption, and the horizontal axis represents the time. A waveform W1 represents the upper limit power consumption of the Laptop PC 1 and a waveform W2 represents the temperature of the chassis surface.

FIG. 8 illustrates an example in which the initial state of the Laptop PC 1 is in the state of the upper limit power consumption (PW_H) and the Laptop PC 1 enters the modern standby mode (M1) from the normal operation mode at a time T1. The mode control portion 40 causes the power setting processing portion 45 to change the setting of the upper limit power consumption from the upper limit power consumption (PW_H) to the upper limit power consumption (PW_L) (see Waveform W1) at the time T1. Herein, the Laptop PC 1 is executing the background processing.

When the Laptop PC 1 is stored in a bag, for example, the temperature of the chassis surface increases. When the temperature of the chassis surface exceeds the temperature TH1, the mode control portion 40 brings the system state into the hibernation state (S4 state) at a time T2, and then interrupts the background processing. Thus, the temperature of the chassis surface decreases from the temperature TH1.

When the temperature of the chassis surface becomes equal to or lower than the temperature TH2, the mode control portion 40 returns the system state to the S0 state (or S0ix state) at a time T3. Herein, in the Laptop PC 1 according to this embodiment, the period from the time T2 to the time T3 is the hibernation state (S4 state). Thus, when the temperature of the chassis surface increases above the temperature TH1, the Laptop PC 1 brings the state into the hibernation state (S4 state) to thereby prevent the increase in the temperature of the chassis surface.

In FIG. 9, the vertical axis of the graph represents the temperature of the chassis surface (° C.) and the horizontal axis represents the time. A waveform W3 represents the temperature of the chassis surface of the Laptop PC 1. Herein, an example in which the background processing frequently occurs and the Laptop PC 1 is stored in a bag is illustrated.

In the example illustrated in FIG. 9, the Laptop PC 1 enters the modern standby mode at a time T10, and then the temperature of the chassis surface exceeds the temperature TH1 at a time T11, a time T13, and a time T15; therefore the state is changed to the hibernation state (S4 state). The temperature of the chassis surface becomes equal to or lower than the temperature TH2 at a time T12, a time T14, and a time T16, the state is returned to the S0 state, and then the background processing is resumed. Herein, the period of the hibernation state (S4 state) corresponds to a period TR1. The background processing is executed during a period from the time T10 to the time T11, during a period from the time T12 to the time T13, during a period from the time T14 to the time T15, and a period after the time T16.

In FIG. 10, the vertical axes of the graph represent the temperature (° C.) of the chassis surface and the upper limit power consumption and the horizontal axis represents the time as with FIG. 8. A waveform W4 represents the upper limit power consumption of the Laptop PC 1 and a waveform W5 represents the temperature of the chassis surface.

The example illustrated in FIG. 10 shows an operation when the temperature of the chassis surface of the Laptop PC 1 exceeds the temperature TH1 in the normal operation mode before entering the modern standby mode.

The mode control portion 40 causes the power setting processing portion 45 to change the setting of the upper limit power consumption from the upper limit power consumption (PW_H) to the upper limit power consumption (PW_L) at a time T21 (see waveform W4). Herein, when the temperature of the chassis surface exceeds the temperature TH1 after the lapse of a predetermined period TR2 (First period) after changing the mode to the modern standby mode, the mode control portion 40 changes the state to the second low power consumption state. More specifically, when the temperature of the chassis surface exceeds the temperature TH1 in a period TR2 (First period) from a time T21 to a time T22, the mode control portion 40 does not change the state to the hibernation state (S4 state).

As described above, the Laptop PC 1 (Information processing device) according to this embodiment has the mode control portion 40 and the power setting processing portion 45. The mode control portion 40 changes the mode to the modern standby mode (Standby mode) of bringing the state into the first low power consumption state (for example, S0ix state) capable of being switched to the first operating state (S0 state) in which the background processing is executed in response to the stop of the display of the display portion 14. The power setting processing portion 45 can set the upper limit power consumption. When the mode control portion 40 changes the mode to the modern standby mode, the power setting processing portion 45 sets the upper limit power consumption (PW_L) in the first operating state (S0 state) so as to be lower than the upper limit power consumption (PW_H) in the second operating state (S0 state in normal operation mode) in the normal operation mode.

Thus, the Laptop PC 1 according to this embodiment changes the setting of the upper limit power consumption so as to be lower than the upper limit power consumption (PW_H) in the second operating state (S0 state in normal operation mode) in the normal operation mode in the modern standby mode (Standby mode), and therefore can reduce the generation of heat when the background processing is executed. Therefore, the Laptop PC 1 according to this embodiment can prevent the chassis surface from getting hot. Moreover, the Laptop PC 1 according to this embodiment can suppress the chassis surface from getting hot or the Laptop PC 1 from entering a state unintended by a user, e.g., the heat dissipation fan 35 is operated or the like, in the modern standby mode (Standby mode).

Moreover, in this embodiment, when the temperature of the chassis surface exceeds the temperature TH1 in the modern standby mode (Standby mode), the mode control portion 40 changes the state to the second low power consumption state (for example, hibernation state (S4 state)) in which the power consumption is lower than that in the first operating state.

Thus, even when placed in a sealed state of being stored in a bag for example, the Laptop PC 1 according to this embodiment can prevent the chassis surface from getting hot.

Moreover, in this embodiment, when the temperature of the chassis surface exceeds the temperature TH1 after the lapse of the predetermined first period (for example, after the period TR2 of FIG. 10) after changing the mode to the modern standby mode (Standby mode), the mode control portion 40 changes the state to the hibernation state (S4 state). More specifically, the mode control portion 40 does not allow the change to the hibernation state (S4 state) during the first predetermined period after changing the mode to the modern standby mode.

Thus, the Laptop PC 1 according to this embodiment can prevent an unnecessary change to the hibernation state (S4 state) and can lengthen the period in which the background processing is executed.

Moreover, in this embodiment, when the temperature of the chassis surface decreases to be equal to or lower than the temperature TH2 which is equal to or lower than the temperature TH1 after changing the state to the hibernation state (S4 state) from the first operating state (S0 state), the mode control portion 40 returns the state to the first operating state (S0 state).

Thus, the Laptop PC 1 according to this embodiment can execute the background processing while preventing an increase in the temperature of the chassis surface in the modern standby mode (Standby mode).

Moreover, in this embodiment, the second low power consumption state described above includes the hibernation state (S4 state) which is the suspension state in which the work contents of the background processing are saved in a nonvolatile storage device (for example, HDD 23). When the temperature of the chassis surface exceeds the temperature TH1 in the modern standby mode, the mode control portion 40 changes the state to the hibernation state (S4 state).

Thus, the Laptop PC 1 according to this embodiment can efficiently reduce an increase in the temperature of the chassis surface in the modern standby mode (Standby mode).

Moreover, in this embodiment, when the execution of the background processing is completed in the modern standby mode, the mode control portion 40 brings the state into the first low power consumption state (for example, S0ix state). The first low power consumption state is an extended state of the S0 state specified in the ACPI specification and is the S0ix state in which the power consumption is reduced to be lower than that in the S0 state.

Thus, the Laptop PC 1 according to this embodiment can execute the background processing in a short return time as compared with the other low power consumption states, such as the hibernation state (S4 state), while reducing the power consumption in the modern standby mode. Moreover, the Laptop PC 1 according to this embodiment can perform processing, such as the reception of e-mails and the reception of the update data of the OS or an application program, for example, as the background processing, and thus can increase the convenience.

Moreover, in this embodiment, the user's action includes the action that a user brings the state into a state in which the user cannot see the display of the display portion 14 (for example, the display chassis is brought into a closed state by a user). The mode control portion 40 stops the display of the display portion 14 in response to the action that a user brings the state into a state in which the user cannot see the display of the display portion 14 and changes the state to the modern standby mode.

Thus, the Laptop PC 1 according to this embodiment can enter the modern standby mode by a simple action and can increase the convenience while reducing heat generation and power consumption.

Moreover, in this embodiment, the mode control portion 40 cancels the modern standby mode in response to a user's action or the occurrence of a predetermined event in the background processing. The power setting processing portion 45 changes the setting of the upper limit power consumption in the second operating state (S0 state in normal operation mode) according to the operating environment when the modern standby mode is canceled by the mode control portion 40.

Thus, appropriate upper limit power consumption according to the operating environment is set when returned from the modern standby mode, the Laptop PC 1 according to this embodiment can increase the convenience while reducing heat generation and power consumption.

Moreover, the control method according to this embodiment includes the mode control step and the power setting processing step. In the mode control step, the Laptop PC 1 changes the mode to the modern standby mode bringing the state into the S0ix state capable of being switched to the first operating state (S0 state) in which the background processing is executed in response to the stop of the display of the display portion 14. When the Laptop PC 1 changes the mode to the modern standby mode by the mode control step in the power setting processing step, the upper limit power consumption (PW_L) in the first operating state (S0 state) is set so as to be lower than the upper limit power consumption (PW_H) in the second operating state (S0 state in normal operation mode) in the normal operation mode.

Thus, the control method according to this embodiment can demonstrate the same effects as those of the Laptop PC 1 described above and can suppress the Laptop PC 1 from entering a state unintended by a user in the modern standby mode (Standby mode).

Second Embodiment

Next, the Laptop PC 1 according to a second embodiment is described with reference to the drawings.

This embodiment describes a modification of the return processing from the hibernation state (S4 state) in the modern standby mode.

The basic configuration of the Laptop PC 1 according to this embodiment is the same as that of the first embodiment illustrated in FIG. 1 and FIG. 2, and therefore the description is omitted herein.

The mode control portion 40 in this embodiment returns the state to the operating state when a predetermined period elapses (Lapse of second period) after changing the state to the hibernation state (S4 state) from the operating state (S0 state). Herein, the predetermined period is a period for about 3 minutes, for example. The predetermined period may be changed based on the throughput and the execution time of the background processing, for example.

Figure 11:
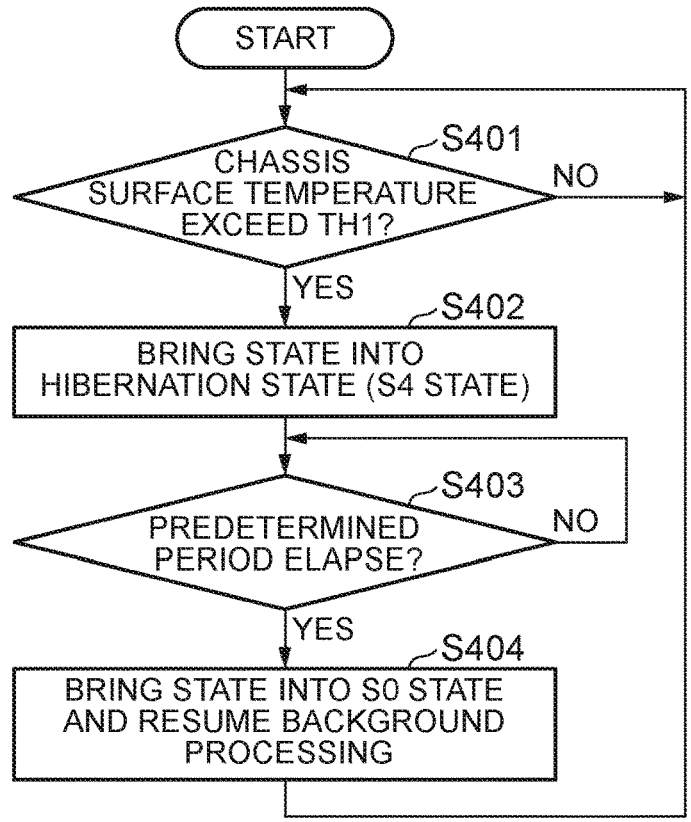
FIG. 11 is a flow chart illustrating an example of transition to a hibernation state in a modern standby mode of a second embodiment.

FIG. 11 is a flow chart illustrating an example of the transition processing to the hibernation state in the modern standby mode of this embodiment.

In FIG. 11, the conditions of the Laptop PC 1 are the same as the conditions in FIG. 6 and the processing of Step S401 and the processing of Step S402 are the same as the processing of Step S201 and the processing of Step S202 illustrated in FIG. 6, and therefore the description is omitted herein.

In Step S403, the mode control portion 40 judges whether a predetermined period has elapsed. The mode control portion 40 judges whether an event trigger showing that a predetermined period has elapsed is received utilizing a timer of the embedded controller 31. When the predetermined period has elapsed (Step S403: YES), the mode control portion 40 advances the processing to Step S404. When the event trigger is not generated (Step S403: NO), the mode control portion 40 maintains the state of suspending in the hibernation state (S4 state) of Step S403.

In Step S404, the mode control portion 40 brings the system state into the S0 state, and then resumes the background processing. The mode control portion 40 brings the state into the S0 state in which the upper limit power consumption is lowered through the embedded controller 31 and the power setting processing portion 45, and then causes the OS or an application program to resume the background processing. After the processing of Step S404, the mode control portion 40 returns the processing to Step S401.

In this embodiment, the processing other than the transition processing to the hibernation state described above is the same as that of the first embodiment illustrated in FIG. 4, FIG. 5, and FIG. 7 described above, and thus the description is omitted.

Figure 12:
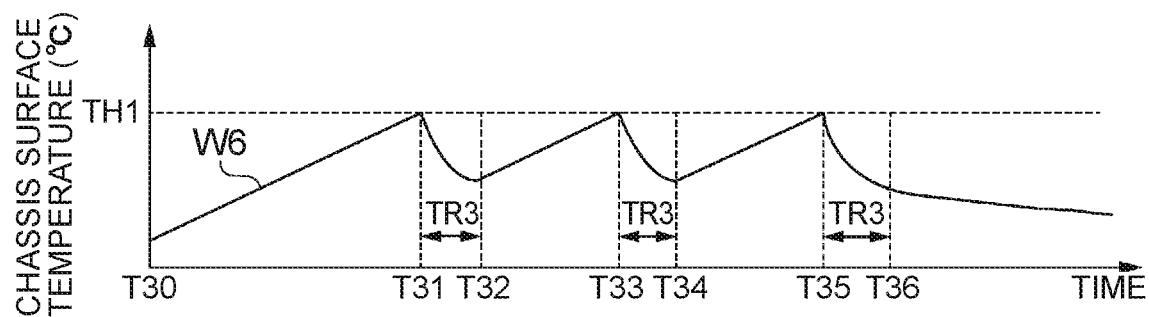
FIG. 12 is a view explaining an example of an operation in the modern standby mode of the Laptop PC according to the second embodiment.

FIG. 12 is a view explaining an example of an operation in the modern standby mode of the Laptop PC 1 according to this embodiment.

In FIG. 12, the vertical axis of the graph represents the temperature of the chassis surface (° C.) and the horizontal axis represents the time. A waveform W6 represents the temperature of the chassis surface of the Laptop PC 1. Herein, an example in which the background processing frequently occurs and the Laptop PC 1 is stored in a bag is illustrated.

In the example illustrated in FIG. 12, the Laptop PC 1 enters the modern standby mode at a time T30 and, the temperature of the chassis surface exceeds the temperature TH1 at a time T31, a time T33, and a time T35, and therefore the state is changed to the hibernation state (S4 state). At a time T32, a time T34, and a time T36, a predetermined period TR3 elapses, the state is returned to the S0 state, and then the background processing is resumed. Herein, the period of the hibernation state (S4 state) corresponds to a period TR3. The background processing is executed during a period from the time T30 to the time T31, during a period from the time T32 to the time T33, during a period from the time T34 to the time T35, and a period after the time T36.

As described above, in the Laptop PC 1 according to this embodiment, when the predetermined period TR3 (Second period) elapses after changing the state to the hibernation state (S4 state) from the operating state, the mode control portion 40 returns the state to the first operating state (S0 state).

Thus, the Laptop PC 1 according to this embodiment can execute the background processing in the modern standby mode (Standby mode) while preventing an increase in the temperature of the chassis surface.

The present invention is not limited to the above-described embodiments and can be altered without deviating from the scope of the present invention.

For example, the above-described embodiments describe the example of the case where the information processing device is the Laptop PC 1 but the information processing device is not limited thereto. The information processing device may be the other devices, such as a tablet terminal device and a desktop PC, for example.

The above-described embodiments describe the example in which, when the temperature of the chassis surface exceeds the temperature TH1, the mode control portion 40 changes the system state to the hibernation state (S4 state) but are not limited thereto. Other states may be acceptable insofar as the state is a low power consumption state in which the temperature of the chassis surface can be reduced. For example, when the upper limit power consumption (Low power consumption mode) of a lower power consumption in the S0 state can be set in the CPU 11, the upper limit power consumption (Low power consumption mode) may be applied in place of the hibernation state.

The above-described embodiments describe the example in which the above-described embodiments are applied to the modern standby of Windows 10 (Windows is a registered trademark.) as an example of the standby mode but are not limited thereto and may be applied to the standby modes of the other OSs. The connect standby of Windows 8 (Windows is a registered trademark.) or the like may be applied to the standby mode, for example.

The above-described embodiments describe the example of using the temperature sensor 33 connected to the embedded controller 31 when detecting the temperature of the chassis surface but a temperature sensor detecting the temperature of the CPU 11 may be used. In this case, the mode control portion 40 presumes the temperature of the chassis surface from the temperature of the CPU 11 to use the same.

In the above-described embodiments, each functional block provided in the mode control portion 40 is not limited to the configuration described above, and the allocation of the process between the blocks may be changed and the processing may be partially provided in the outside of the mode control portion 40. The power setting processing portion 45 may be configured so as to be contained in the mode control portion 40.

The above-described embodiments describe the example in which the mode control portion 40 stops the display of the display portion 14 in response to a user's action of bringing the state into the state in which the user cannot see the display of the display portion 14 but a configuration may be acceptable in which the display of the display portion 14 is stopped in response to a user's action outside the mode control portion 40. In this case, the mode control portion 40 detects that the display of the display portion 14 is stopped, and then changes the mode to the modern standby mode bringing the state into the S0ix state (First low power consumption state) capable of being switched to the operating state (S0 state) in which the background processing is executed in response to the stop of the display. Moreover, the power setting processing portion 45 may set the upper limit power consumption in the first operating state (S0 state) so as to be lower than the upper limit power consumption in the second operating state (S0 state in the normal operation mode) in the normal operation mode in response to the stop of the display of the display portion 14.

Moreover, the above-described embodiments describe the example in which the upper limit power consumption according to the operating environment is set in the Laptop PC 1 when returned to the normal operation mode from the modern standby mode but are not limited thereto. For example, the Laptop PC 1 may be configured so that the setting of the upper limit power consumption immediately before the mode is changed to the modern standby mode is saved, and, when returned to the normal operation mode, the setting is changed to the setting of the upper limit power consumption immediately before saving.

Each configuration provided in the Laptop PC 1 (Information processing device) described above has a computer system thereinside. The processing in each configuration provided in the Laptop PC 1 described above may be performed by recording a program for realizing the function of each configuration provided in the Laptop PC 1 described above in a computer-readable recording medium, and then causing the computer system to read the program recorded in the recording medium to execute the program. Herein, the "causing the computer system to read the program recorded in the recording medium to execute the program" includes the installing of the program in the computer system. The "computer system" as used herein includes hardware, such as an OS and peripheral devices.

Moreover, the "computer system" may also contain a plurality of computer devices connected through a network containing communication lines, such as the Internet, WAN, LAN, and a dedicated line. The "computer-readable recording medium" refers to storage devices, such as portable media, such as a flexible disk, a magneto-optical disc, a ROM, and a CD-ROM, and a hard disk built in the computer system. Thus, a recording medium storing a program may be a transient recording medium, such as a CD-ROM.

Moreover, the recording medium includes a recording medium provided inside or outside and accessible from a distribution server in order to distribute the program. A configuration in which a program is divided into a plurality of partial programs, downloaded at different timing, and then united in each configuration provided in the Laptop PC 1 may be acceptable or distribution servers distributing the divided programs may be different from each other. The "computer-readable recording medium" also includes one holding the program for a definite period of time, such as a volatile memory (RAM) inside the computer system serving as a server or a client when the program is transmitted through a network. Moreover, the program may be one for realizing some of the functions described above. Furthermore, the program may be one capable of realizing the functions described above in combination with programs already recorded in the computer system, a so-called differential file (Differential program).

Some or all of the functions described above may be realized as an integrated circuit, such as an LSI (Large Scale Integration). The functions described above may be individually processorized or may be partially or entirely integrated to be processorized. A circuit integration technique is not limited to the LSI and may be realized by a dedicated communication circuit or a general-purpose processor. When a circuit integration technique replacing the LSI appears with the progress of the semiconductor technology, an integrated circuit obtained by the technique may be used.

The invention claimed is:

1. An information processing device, which has a standby mode and a normal operation mode, comprising:
   a display;
   a processor which executes at least a standby mode when a display of the display portion turns off and a normal operation mode when the display turns on, wherein:
   the standby mode has a first low power consumption state and a first operating state to which the first low power consumption state can switch, and in which background processing is executed, and
   the normal operation mode has a second operating state;
   a combined service/utility, driver and bios (mode control portion) that changes a mode between the standby mode and the normal operation mode; and
   a power driver (power setting processing portion) that sets an upper limit power consumption when the mode of the processor is changed, wherein:
   when the mode control portion changes the mode to the standby mode, the power setting processing portion sets a first upper limit power consumption in the first operating state, and when the mode control portion changes the mode to the normal operation mode, the power setting processing portion sets a second upper limit power consumption in the second operating state greater than the first upper limit power consumption.

2. The information processing device according to claim 1, wherein:
   the power setting processing portion further sets a third upper limit power consumption in a second low power consumption state,
   the mode control portion changes the state to the second low power consumption state in which the third upper limit power consumption is lower than the first upper limit power consumption when a temperature of a chassis surface exceeds a predetermined first temperature in the standby mode.

3. The information processing device according to claim 2, wherein:
   the mode control portion changes the state to the second low power consumption state when the temperature of the chassis surface exceeds the first temperature after lapse of a predetermined first period after changing the mode to the standby mode.

4. The information processing device according to claim 2, wherein:
   the mode control portion returns the state to the first operating state, when the temperature of the chassis surface decreases to a temperature equal to or lower than a second temperature which is a temperature equal to or lower than the first temperature, after changing the state to the second low power consumption state from the first operating state.

5. The information processing device according to claim 2, wherein:
   the mode control portion returns the state to the first operating state when a predetermined second period elapses after changing the state to the second low power consumption state from the first operating state.

6. The information processing device according to claim 2, wherein:
   the second low power consumption state includes a hibernation state which is a suspension state in which a work content of the background processing is saved in a nonvolatile storage device, and
   the mode control portion changes the state to the hibernation state when the temperature of the chassis surface exceeds the first temperature in the standby mode.

7. The information processing device according to claim 1, wherein:
   the mode control portion brings the state into the first low power consumption state when execution of the background processing is completed in the standby mode.

8. The information processing device according to claim 1, wherein:
   the mode control portion cancels the standby mode in response to a user action or occurrence of a predetermined event in the background processing, and
   the power setting processing portion changes the setting of the second upper limit power consumption according to an operating environment when the standby mode is canceled by the mode control portion.

9. The information processing device according to claim 1, wherein:
the first low power consumption state is an extended state of an S0 state specified in an ACPI (Advanced Configuration and Power Interface) specification and is an S0ix state in which the first upper limit power consumption is reduced to be lower than a fourth upper limit power consumption in the S0 state.

* * * * *